(12) United States Patent
Tabuchi et al.

(10) Patent No.: US 10,156,059 B2
(45) Date of Patent: Dec. 18, 2018

(54) CONSTRUCTION MACHINE INCLUDING ENGINE

(71) Applicants: Kobe Steel, Ltd., Kobe-shi (JP); KOBELCO CONSTRUCTION MACHINERY CO., LTD., Hiroshima-shi (JP)

(72) Inventors: Satoshi Tabuchi, Kobe (JP); Kyoko Masuda, Kobe (JP); Zenzo Yamaguchi, Kobe (JP); Kazuhiro Ueda, Hiroshima (JP); Daisuke Noda, Hiroshima (JP); Yusuke Fujiwara, Hiroshima (JP)

(73) Assignees: Kobe Steel, Ltd., Kobe-shi (JP); KOBELCO CONSTRUCTION MACHINERY CO., LTD., Hiroshima-shi (JP)

(*) Notice: Subject to any disclaimer, the term of this patent is extended or adjusted under 35 U.S.C. 154(b) by 106 days.

(21) Appl. No.: 15/168,600

(22) Filed: May 31, 2016

(65) Prior Publication Data
US 2016/0356018 A1 Dec. 8, 2016

(30) Foreign Application Priority Data

Jun. 8, 2015 (JP) .................... 2015-115483

(51) Int. Cl.
*F01P 1/00* (2006.01)
*F01P 5/06* (2006.01)
(Continued)

(52) U.S. Cl.
CPC ........... *E02F 9/0866* (2013.01); *B60K 11/02* (2013.01); *B60K 13/04* (2013.01); *E02F 9/0891* (2013.01);
(Continued)

(58) Field of Classification Search
CPC ........ B60K 11/06; F01P 2001/005; F01P 1/00; F01P 5/06
See application file for complete search history.

(56) References Cited

U.S. PATENT DOCUMENTS 5,709,175 A * 1/1998 Carroll ............... F01P 11/12
123/41.49
5,816,350 A * 10/1998 Akira ............... B60H 1/3227
180/68.1
(Continued)

FOREIGN PATENT DOCUMENTS

EP 0 734 897 A2 10/1996
EP 1 637 710 A1 3/2006
(Continued)

OTHER PUBLICATIONS

Extended European Search Report dated Oct. 11, 2016 in Patent Application No. 16173072.6.

*Primary Examiner* — James A Shriver, II
*Assistant Examiner* — Vaughn Coolman
(74) *Attorney, Agent, or Firm* — Oblon, McClelland, Maier & Neustadt, L.L.P.

(57) ABSTRACT

Provided is a construction machine capable of smooth exhaust and suppression of a leak of noise from an engine room, including an engine guard defining an engine room, a cooling fan disposed in the engine room, a projection element projecting upward beyond the engine guard, and an exhaust duct. The exhaust duct has a bent shape including a first duct section extending along an axial flow direction of the cooling fan from an upstream end portion surrounding a duct inlet to a connection portion and a second duct section extending upward from the connection portion and surrounding a duct outlet opened upward, also including an
(Continued)

engine concealment section obstructing a direct view to an engine through the duct outlet from outside the engine room.

7 Claims, 4 Drawing Sheets

(51) Int. Cl.
    *B60K 13/06*     (2006.01)
    *E02F 9/08*     (2006.01)
    *B60K 11/02*     (2006.01)
    *B60K 13/04*     (2006.01)
    *B60K 11/00*     (2006.01)
    *E02F 3/32*     (2006.01)

(52) U.S. Cl.
    CPC . *F01P 5/06* (2013.01); *E02F 3/32* (2013.01); *F01P 2001/005* (2013.01)

(56) References Cited

U.S. PATENT DOCUMENTS

| | | | | |
|---|---|---|---|---|
| 5,816,351 | A * | 10/1998 | Akira | B60K 11/08 180/68.1 |
| 6,192,839 | B1 * | 2/2001 | Takeshita | E02F 9/0866 123/41.49 |
| 6,622,668 | B2 * | 9/2003 | Izumi | E02F 9/00 123/41.49 |
| 6,745,860 | B2 * | 6/2004 | Yabe | E02F 9/0866 180/68.1 |
| 8,550,198 | B2 * | 10/2013 | Isaka | B60K 11/04 180/291 |
| 8,684,116 | B2 * | 4/2014 | Nakashima | B60K 11/08 180/68.1 |
| 8,857,384 | B2 * | 10/2014 | Yotsuzuka | E02F 9/0866 123/41.58 |
| 9,228,317 | B2 * | 1/2016 | Yabe | B60K 11/04 |
| 9,228,318 | B2 * | 1/2016 | Yabe | B60K 11/02 |
| 9,611,624 | B2 * | 4/2017 | Takeuchi | H01M 2/1083 |
| 2001/0007292 | A1 | 7/2001 | Yabf | |
| 2010/0266458 | A1 * | 10/2010 | Takeshita | E02F 9/0866 422/109 |
| 2010/0275588 | A1 * | 11/2010 | Kamata | B60K 5/1208 60/322 |
| 2011/0214931 | A1 | 9/2011 | Nakashima | |
| 2013/0319787 | A1 * | 12/2013 | Kobayashi | E02F 9/0866 180/309 |
| 2014/0318882 | A1 * | 10/2014 | Sawada | B60K 13/04 180/309 |

FOREIGN PATENT DOCUMENTS

| | | |
|---|---|---|
| EP | 2 365 139 A1 | 9/2011 |
| JP | 11-254976 A | 9/1999 |
| JP | 2000-303497 A | 10/2000 |
| JP | 2001-193102 | 7/2001 |
| JP | 2005-16321 | 1/2005 |

\* cited by examiner

CONSTRUCTION MACHINE INCLUDING ENGINE

TECHNICAL FIELD

The present invention relates to a construction machine including a cooling fan for taking the air for cooling into an engine room and an exhaust duct for discharging the air in the engine room to the outside.

BACKGROUND ART

As a construction machine including an engine and equipment for cooling of the engine, there has been known a construction machine disclosed in Japanese Unexamined Patent Publication No. 2001-193102 and Japanese Unexamined Patent Publication No. 2005-16321. The construction machine disclosed therein includes a cooling fan that takes the air for cooling into an engine room and an exhaust duct for discharging the air in the engine room to the outside of the engine room. The exhaust duct extends along an axial flow direction of the cooling fan on the inner side of an engine hood located on the upper side of the engine room. The air is discharged in the axial flow direction through the exhaust duct. A passage formed by such an exhaust duct can be a route which allows noise caused by an engine and the like in the engine room to leak to the outside. Therefore, it is desired to attenuate the noise in the exhaust duct by sufficiently securing a duct length of the exhaust duct.

The structure shown in FIG. 2 of Japanese Unexamined Patent Publication No. 2005-16321 includes a post-treatment device for treating exhaust gas from the engine, the device projecting upward from the engine room and located on an extended line of the exhaust duct. The post-treatment device or a projection element similar to the post-treatment device can be an obstacle limiting the duct length of the exhaust duct when the size thereof is increased. The limitation of the duct length obstructs suppression of the leak of the noise through the exhaust duct. Furthermore, the projection element may interfere with the air discharged from the exhaust duct to thereby prevent the air from smooth discharge.

SUMMARY OF INVENTION

It is an object of the present invention to provide a construction machine including an engine, the construction machine being capable of smooth exhaust and suppression of a leak of noise from an engine room irrespective of the presence of a projection element which projects upward from an engine room housing the engine.

Provided is a construction machine including: an engine; an engine guard defining an engine room which is a space where the engine is housed; a heat exchanger disposed in the engine room; a cooling fan disposed in the engine room so as to suck air for cooling from outside of the engine room and to make the air pass through the heat exchanger; a projection element that projects upward beyond the engine guard; and an exhaust duct forming a passage for leading the air, which has passed through the heat exchanger, to outside of the engine room. The exhaust duct has a bent shape including a first duct section that includes an upstream end portion surrounding a duct inlet opened in the engine room and a connection portion closer to the projection element than the upstream end portion, the first duct section extending along an axial flow direction of the cooling fan from the upstream end portion to the connection portion, and a second duct section extending upward from the connection portion of the first duct section and surrounding a duct outlet opened upward outside the engine room, and the exhaust duct also includes an engine concealment section that obstructs a direct view to the engine through the duct outlet from outside the engine room.

DESCRIPTION OF EMBODIMENTS

An embodiment of the present invention is explained with reference to the drawings. The explanation involves references of directions shown in the figures.

Figure 1:
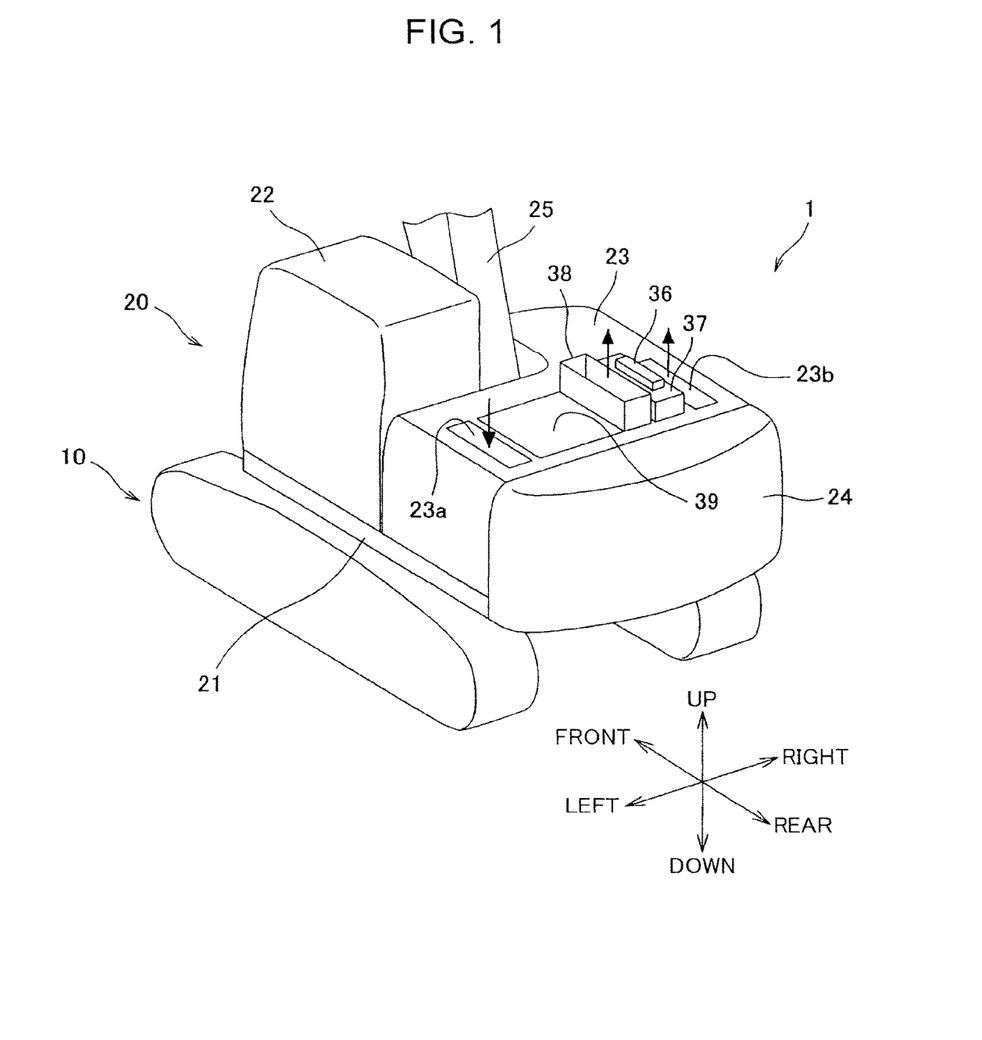
FIG. 1 is a perspective view showing a part of a construction machine according to an embodiment of the present invention.

FIG. 1 is a perspective view showing a main part of a construction machine according to an embodiment of the present invention. The construction machine 1, for example, a hydraulic shovel, includes a lower traveling body 10 capable of traveling and an upper slewing body 20. The lower traveling body 10 includes traveling means, for example, a crawler. The upper slewing body 20 is mounted on the lower traveling body 10 so as to be slewable with respect to the lower traveling body 10.

The upper slewing body 20 includes a slewing frame 21, a cab 22, an engine guard 23, a counter weight 24, and an attachment 25. The slewing frame 21 is supported on the lower traveling body 10 via a slewing mechanism. The cab 22, the engine guard 23, the counter weight 24, and the attachment 25 are mounted on the slewing frame 21. The cab 22 is an operation room disposed on a front part of the slewing frame 21. The engine guard 23 is a structure enclosing an engine room 31 shown in FIG. 2. The engine room 31 is an internal space in which the engine 32 is housed. The counter weight 24 is a weight disposed rearward of the engine guard 23. The attachment 25 is attached to the front part of the slewing frame 21. In the case where the construction machine 1 is a hydraulic shovel, the attachment 25 includes a boom, an arm, and a bucket.

Figure 2:
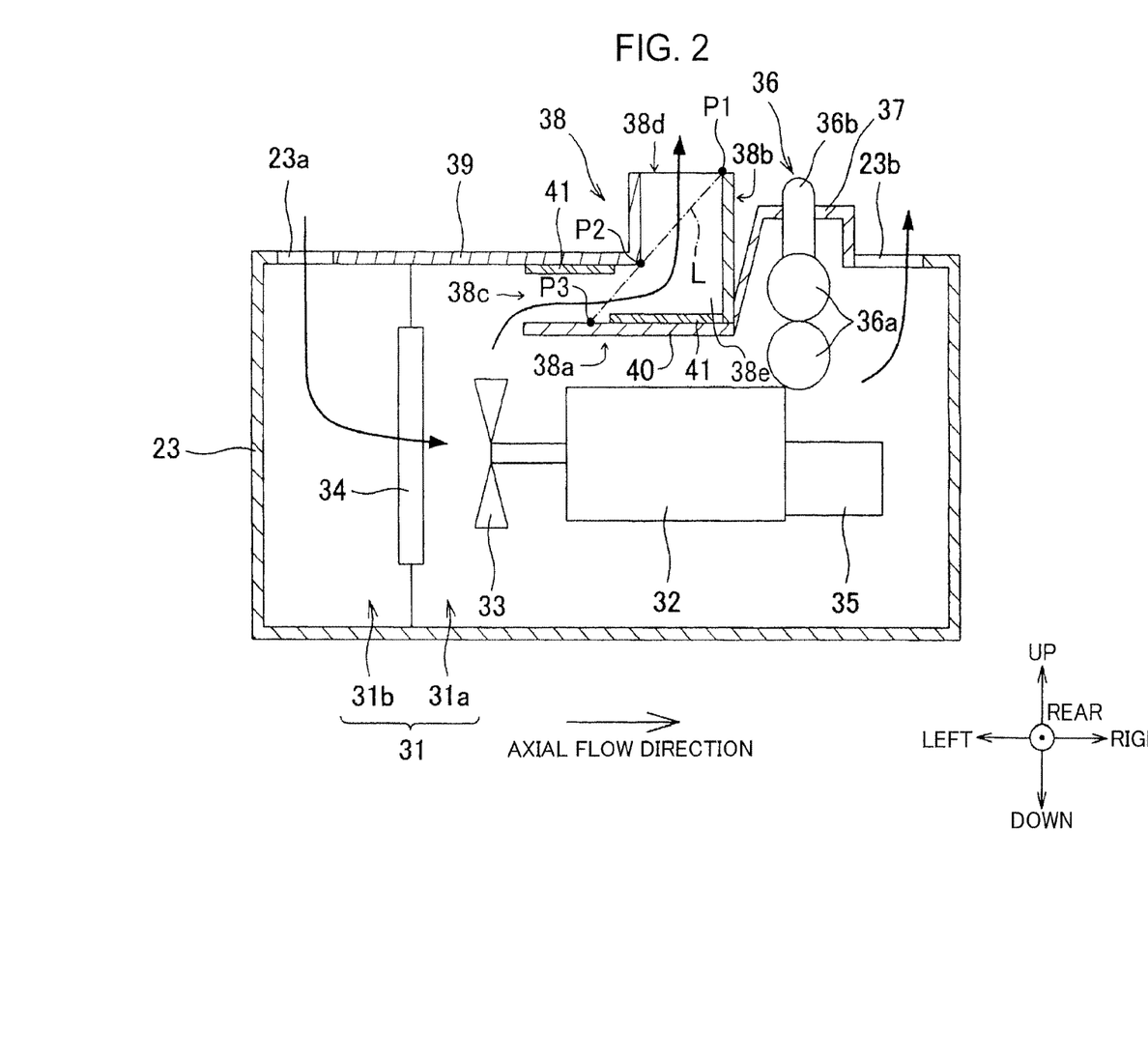
FIG. 2 is a sectional view showing the inside of an engine room of the construction machine.

FIG. 2 is a sectional view showing the inside of the engine room 31 and is a rear view of the slewing body 20 viewed from the back. In the engine room 31, there are disposed a cooling fan 33, a radiator 34, which is a heat exchanger, and the like, besides the engine 32. The radiator 34 partitions the engine room 31 into a main room 31a housing the engine 32 and the like and an air intake chamber 31b for taking in the air for cooling.

The engine 32 includes a crankshaft. The engine 32 is disposed such that the crankshaft extends in the left-right direction of the upper slewing body 20. The cooling fan 33 is disposed on the left side of the engine 32, mechanically coupled to the crankshaft to be thereby rotationally driven involved by the rotation of the crankshaft. The cooling fan 33 is not limited to one which is driven by the engine 32. The cooling fan 33 may be, for example, one which is hydraulically driven. The radiator 34 is disposed on the left side of the cooling fan 33, allowing coolant for cooling the engine 32 to be flowed in the radiator 34. The radiator 34, the cooling fan 33, and the engine 32 are thus arranged in this order from an upstream side to a downstream side with respect to an axial flow direction of the cooling fan 33 (a direction from the left to the right in FIG. 2).

The engine room 31 further houses a hydraulic pump 35 and a post-treatment device 36. The hydraulic pump 35 is disposed on the right side of the engine 32 and driven by the engine 32 to thereby discharge hydraulic oil for moving the attachment 25. The post-treatment device 36, which processes exhaust gas from the engine 32, includes a plurality of mufflers 36a each extending in the front-back direction (a depth direction in FIG. 2) and an exhaust gas pipe 36b that leads the exhaust gas from the engine 32 to the outside of the engine room 31. At least the exhaust gas pipe 36b in the post-treatment device 36 constitutes a projection element projecting upward beyond the engine room 31. The engine guard 23 includes a guard 37 that covers a part of the exhaust gas pipe 36b except for the distal end portion thereof. The guard 37 projects upward beyond the upper surface of the other portions of the engine guard 23.

The engine guard 23 is provided with an intake port 23a and an exhaust port 23b in an upper part thereof. The intake port 23a is located on the upper side of the air intake chamber 31b, allowing the air for cooling to be taken into the engine room 31 from the outside through the intake port 23a. The exhaust port 23b is formed in a right end portion of an upper part of the main room 31a, allowing the air flowed around the engine 32 to contribute to cooling of the engine 32 to be discharged to the outside of the engine room 31 through the exhaust port 23.

The construction machine 1 further includes an exhaust duct 38. The exhaust duct 38 has a shape including a first duct section 38a and a second duct section 38b, the shape being an L-shape bent in a halfway portion thereof. The first duct section 38a includes an upstream end portion surrounding a duct inlet 38c opened in the engine room 31 and a connection portion 38e which is an end portion closer to the post-treatment device 36 including the projection element (the exhaust gas pipe 36b) than the upstream end portion (in this embodiment, an end portion in the vicinity of the post-treatment device 36). The first duct section 38a extends along the axial flow direction of the cooling fan 33 from the upstream end portion to the connection portion 38e. The second duct section 38b extends upward from the connection portion 38e and includes a downstream end portion surrounding a duct outlet 38d opened upward outside the engine room 31. The second duct section 38b is, thus, connected to the first duct section 38a while being substantially orthogonal to the first duct section 38a.

The duct outlet 38d, which is an opening surrounded by the upper end, i.e., the downstream end portion, of the second duct section 38b, is directed upward, thus making it possible to prevent the air discharged through the duct outlet 38d and the post-treatment device 36 from interference with each other. Furthermore, the duct outlet 38d, located on the upper side of the upper end of the guard 37 of the post-treatment device 36 and further of the upper end of the exhaust gas pipe 36b of the post-treatment device 36, makes the prevention of the interference be sure. The present invention, however, also encompasses a form in which the duct outlet 38d is located on the lower side of the upper end of the post-treatment device 36.

The first duct section 38a includes a duct top wall that defines the upper end of the passage formed in the first duct section 38a and a duct bottom wall that defines the lower end of the passage formed in the first duct section 38a. The duct top wall is configured by a part of an engine hood 39 located on the upper side of the engine room 31, and the duct bottom wall is configured by a flat plate 40 provided in a position separated downward from the engine hood 39. The engine hood 39 is connected to the engine guard 23 via, for example, a hinge, so as to be capable of rotational movement around a horizontal axis, that is, capable of opening and closing. The engine hood 39 opens the engine room 31 upward by its rotational movement upward, that is, in an opening direction, thereby enabling maintenance of devices in the engine room 31 to be performed.

Furthermore, the exhaust duct 38 includes an engine concealment section that obstructs a direct view to the engine 32 through the duct outlet 38d from the outside of the engine room 31. In this embodiment, the first duct section 38a is given an enough large duct length, in a cross section shown in FIG. 2, to make a straight line L interconnecting a point P1 most distant from the duct inlet 38c at the edge of the duct outlet 38d (that is, a point at the right end) and a point P2 of a corner on the inner side of a portion at which the second duct section 38h and the engine hood 39 configuring the duct top wall of the first duct section 38a intersects each other intersect, at a point P3, the plate 40 configuring the duct bottom wall of the first duct section 38a. A portion of the plate 40 on the right side (the opposite side of the duct inlet 38c) of the point P3 forms the engine concealment section.

The construction machine 1 according to this embodiment further includes a plurality of sound absorption members 41 provided on the inner side surface of the exhaust duct 38 to absorb sound propagated in the exhaust duct 38. Specifically, the sound absorption members 41 are provided in a specific portion of the inner side surface, that is, the lower surface of the duct top wall and a specific portion of the inner side surface, that is, the upper surface, of the duct bottom wall of the first duct section 38a, so as to cover the specific portions. The material of the sound absorption members 41 can be selected out of publicly-known materials as appropriate. Respective positions of the sound absorption members 41 are not limited to the positions shown in FIG. 2. The sound absorption members 41 may be provided, for example, on the inner side surface of the second duct section 38b or on the entire inner side surface of the exhaust duct 38.

Next will be explained the action of the construction machine 1. Arrows in FIG. 2 indicate a main flow of the air in the engine room 31. The cooling fan 33 is rotationally driven to thereby take the air for cooling into the air intake chamber 31b from the outside of the engine room 31 through the intake port 23a and makes the air pass through the radiator 34. Having cooled the coolant flowing in the radiator 34, the air is flowed in the centrifugal direction mainly involved by the rotation of the cooling fan 33 and introduced into the exhaust duct 38 through the duct inlet 38c. The air is discharged to the outside of the engine room 31 through the duct outlet 38d of the exhaust duct 38. The duct inlet 38c is located downstream of the cooling fan 33 with respect to an axial flow direction (that is, rightward thereof) and radially outward of the cooling fan 33, so as to allow the air flowed in the centrifugal direction of the cooling fan 33 to be thus smoothly discharged through the exhaust duct 38. The air having been flowed from the cooling fan 33 toward the engine 32 passes through the periphery of the engine 32 and is discharged through the exhaust port 23b.

This embodiment includes the engine hood 39 disposed substantially flush with the upper surface of the engine guard 23 and the plate 40 disposed below the upper surface of the engine guard 23, thereby allowing the duct inlet 38c to be opened upstream in the axial flow direction (that is, leftward). This allows the air flowed in the centrifugal direction of the cooling fan 33 to be directly and easily flowed into the first duct section 38a along the axial flow direction of the cooling fan 33. The present invention is, however, not limited to the configuration and also encompasses a form in which an engine hood projects upward beyond an engine guard, for example, as described in Japanese Unexamined Patent Publication No. 2005-16321.

The shape of the exhaust duct 38 of the construction machine 1 makes it possible to effectively suppress a leak of noise to the outside of the engine room 31 and to perform smooth exhaust, regardless of the presence of the post-treatment device 36 including the projection element.

If having a conventional shape, that is, a shape including only a portion along the axial flow direction, the exhaust duct 38 must have a markedly limited duct length for avoidance from interference with the post-treatment device 36, which allows the leak of noise through the exhaust duct 38. Besides, it generates the possibility that the air discharged from the exhaust duct 38 interferes with the post-treatment device 36.

In contrast, the exhaust duct 38 shown in FIG. 2, having a bent shape including the first duct section 38a extending, along the axial flow direction of the cooling fan 33, toward the post-treatment device 36 from the duct inlet 38c opening in the engine room 31 and the second duct section 38b extending upward from the connection portion 38e equivalent to the terminal end portion of the first duct section 38a and surrounding the duct outlet 38d opening upward on the outside of the engine room 31, can be given a large duct length regardless of the presence of an obstacle (a projection element) illustrated by the post-treatment device 36. In summary, even when the first duct section 38a cannot have a large duct length because of the post-treatment device 36, the exhaust duct 38 including the second duct section 38b extending upward from the connection portion 38e at the terminal end of the first duct section 38a can have a large total duct length enough to effectively reduce noise leaking through the exhaust duct 38.

Furthermore, the exhaust duct 38, which includes the engine concealment section that obstructs a direct view to the engine 32 through the duct outlet 38d from the outside of the engine room 31, can prevent at least noise from the engine 32 from direct leak to the outside, thereby allowing the leak of the noise to be more effectively reduced. In addition, the duct outlet 38d surrounded by the second duct section 38b is opened upward with absence of an obstacle on an extended line of the duct outlet 38d, which also allows smooth exhaust through the duct outlet 38d to be performed.

Moreover, the engine concealment section according to this embodiment not only obstructs the direct view to the engine 32 through the duct outlet 38d from the outside of the engine room 31 but also functions as an engine room concealment section that conceals, as shown in FIG. 2, a direct view to the engine room 31 through the duct outlet 38d from the outside of the engine room 31. This makes it possible to prevent not only the noise from the engine 32 but also the noise from the devices disposed in the engine room 31 from direct leak to the outside of the engine room 31 through the duct outlet 38d to thereby enhance the noise leak suppression effect.

In this embodiment, the duct top wall of the first duct section 38a is configured by a part of the engine hood 39 and the duct bottom wall is configured by the plate 40 separated downward from the engine hood 39. This allows the first duct section 38a to have a large capacity, with a simple structure.

In this embodiment, forming the engine concealment section by the plate 40 which is the duct bottom wall eliminates the need for an additional new members to suppress noise leak, which allows the structure to be simplified. For example, even with the change of the duct length of the second duct section 38b or the breadth of the opening section 38d, it is possible to set the dimensions (in particular, the dimension in the axial flow direction) of the plate 40 so as to obstruct the direct view of the engine room 31 from the outside of the engine room 31 through the duct outlet 38d.

The sound absorption members 41 in this embodiment, disposed on the inner side surface of the exhaust duct 38, is able to effectively attenuate noise leaked through the exhaust duct 38.

Figure 3:
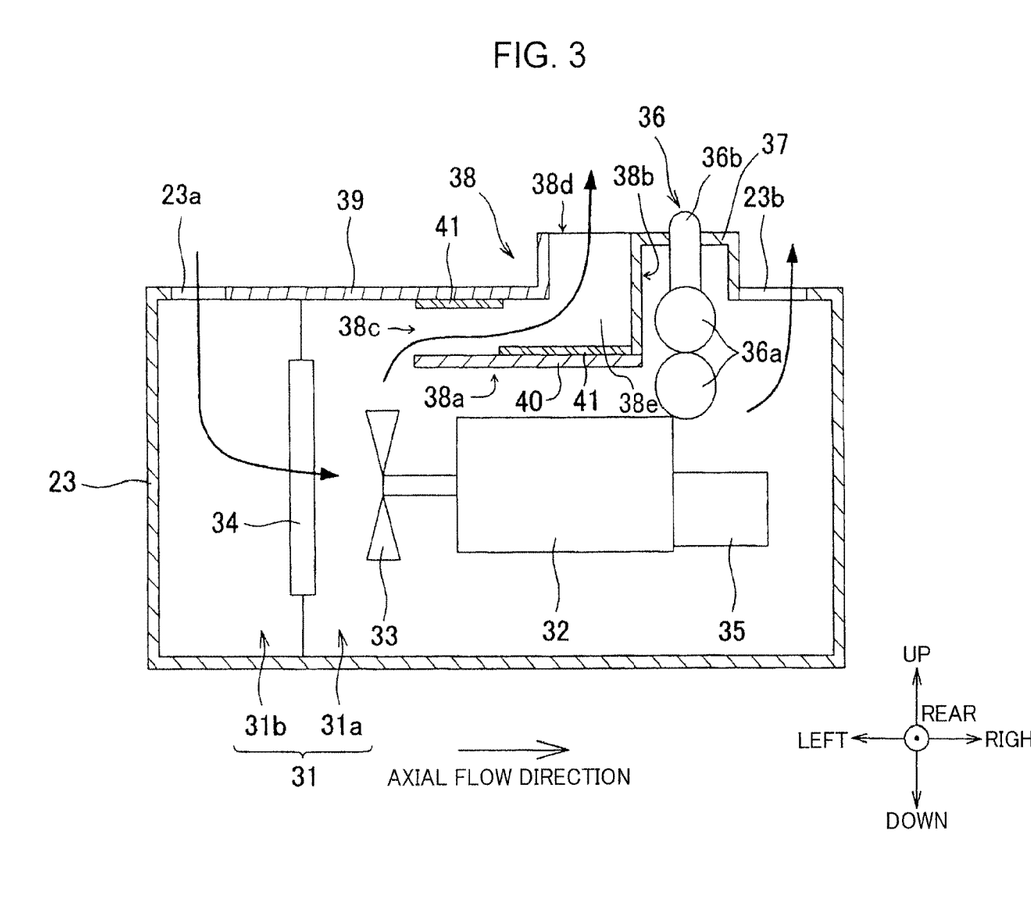
FIG. 3 is a sectional view showing the inside of the engine room according to a modification 1.

FIG. 3 is a sectional view showing the internality of the engine room 31 according to a modification 1. The following is only an explanation about differences from the embodiment, not including explanation about the components common to the embodiment and effects achieved by the components.

In the modification 1, the second duct section 38b includes a plurality of duct sidewalls that define a side end of a passage formed by the second duct section 38b similarly to the embodiment; however, the duct sidewall closest to the post-treatment device 36 among the duct sidewalls, namely, the right sidewall in FIG. 3, configures a part of the guard 37 that covers at least the exhaust gas pipe 36b of the post-treatment device 36 (that is, the left sidewall in FIG. 3). In other words, the part of the guard 37 that covers the post-treatment device 36 is also used as a wall constituting the exhaust duct 38. This makes it possible to reduce the number of components and to simplify the structure of the exhaust duct 38. Besides, it is possible to locate the connection portion 38e equivalent to the terminal end of the first duct section 38a closer to the post-treatment device 36 to give a large duct length to the first duct section 38a.

Figure 4:
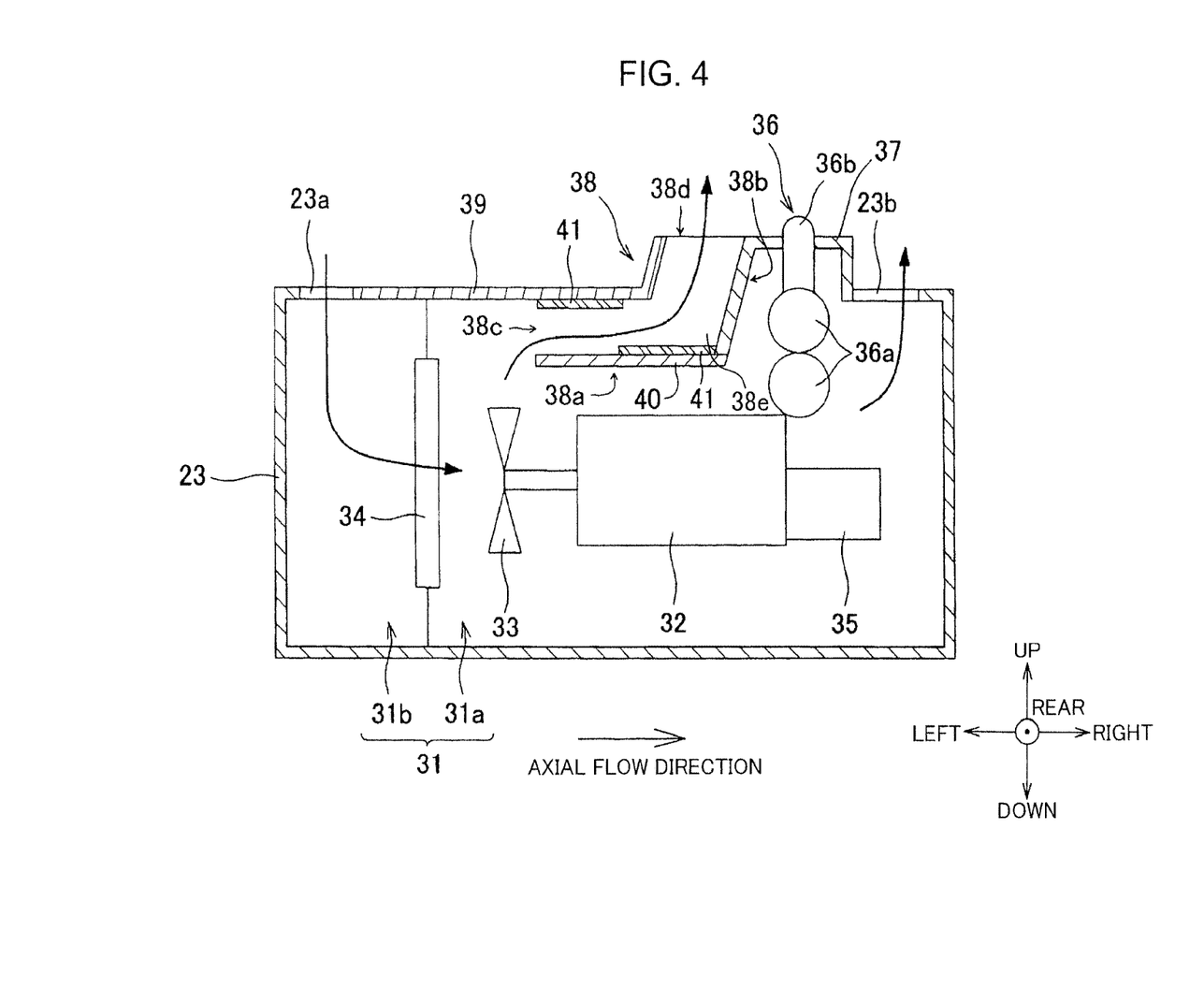
FIG. 4 is a sectional view showing the inside of the engine room according to a modification 2.

FIG. 4 is a sectional view showing the internality of the engine room 31 according to a modification 2. In the modification 2, the duct sidewall of the second duct section 38b configures a part of the guard 37 that covers the post-treatment device 36, similarly to the modification 1 (that is, the left sidewall in FIG. 4); however, the duct sidewall slightly inclines downstream in the axial flow direction downstream with respect to the vertical direction. In other words, the angle at which the first duct section 38a and the second duct section 38b intersect, namely, a bending angle, is an obtuse angle. This reduces a pressure loss of the air passing through a boundary portion between the first and second duct sections 38a and 38b to enable smoother exhaust through the exhaust duct 38 to be performed.

The present invention is not limited to the embodiment. It is possible to appropriately combine the elements of the embodiments or add various changes to the embodiment without departing from the spirit of the present invention.

For example, the first duct section according to the present invention may slightly incline with respect to the axial flow direction of the cooling fan. Besides, each of the first and second duct sections do not have to be linear and may be bent or curved within the bound of involving no marked flow resistance.

The opening direction of the duct outlet is not strictly limited to the upward direction along the vertical direction. The direction of the duct outlet only has to be a direction including an upward component and a direction allowing the interference between the projection element and the exhaust to be avoided. The direction may slightly incline with respect to the vertical direction within the bound of satisfying the above condition.

As explained above, there is provided a construction machine including an engine, the construction machine being capable of smooth exhaust and suppression of a leak of noise from an engine room irrespective of the presence of a projection element which projects upward from an engine room housing the engine.

Provided is a construction machine including: an engine; an engine guard defining an engine room which is a space where the engine is housed; a heat exchanger disposed in the engine room; a cooling fan disposed in the engine room so as to suck air for cooling from outside of the engine room and to make the air pass through the heat exchanger; a projection element that projects upward beyond the engine guard; and an exhaust duct forming a passage for leading the air, which has passed through the heat exchanger, to outside of the engine room. The exhaust duct has a bent shape including a first duct section that includes an upstream end portion surrounding a duct inlet opened in the engine room and a connection portion closer to the projection element than the upstream end portion, the first duct section extending along an axial flow direction of the cooling fan from the upstream end portion to the connection portion, and a second duct section extending upward from the connection portion of the first duct section and surrounding a duct outlet opened upward outside the engine room, and the exhaust duct also includes an engine concealment section that obstructs a direct view to the engine through the duct outlet from outside the engine room.

The bent shape of the exhaust duct enables the air in the engine room to be smooth discharged upward with no interference with the projection element. In addition, even when the presence of the projection element limits a first duct length of the first duct section, that is, the length from the upstream end portion to the connection portion, the addition of the second duct length of the second duct section extending upward from the connection portion, that is, the length from the connection portion to the downstream end portion, enables the exhaust duct to have a large total duct length equivalent to a sum of the first and second duct lengths. The exhaust duct, thus, can effectively reduce noise leaking to the outside of the engine room through the exhaust duct, regardless of the presence of the projection element. Furthermore, the bent shape of the exhaust duct allows the exhaust duct to include the engine concealment section that obstructs a direct view to the engine through the duct outlet from the outside of the engine room, the engine concealment section allowing the leak of the noise through the duct outlet to be more effectively reduced.

Preferably, the exhaust duct further includes an engine room concealment section that obstructs a direct view to the engine room through the duct outlet from the outside of the engine room. The engine room concealment section makes it possible to effectively reduce a leak to the outside of the engine room through the duct outlet of not only noise emitted from the engine but also noise emitted from the other devices in the engine room.

It is preferable that the first duct section includes a duct bottom wall that defines the lower end of a passage formed in the first duct section, the duct bottom wall including the engine concealment section. This structure makes it possible to conceal the engine from the duct outlet by effective utilization of the duct bottom wall defining the lower end of the passage to thus eliminate the need for additional new members for forming the engine concealment section.

In the case of construction machine including an engine hood located on the upper side of the engine room to cover the engine room, the first duct section can include: a duct top wall configured by a part of the engine hood and defining the upper end of a passage formed in the first duct section; and a duct bottom wall provided at a position separated downward from the engine hood and defining the lower end of the passage formed by the first duct section. Thus forming the first duct section by utilization of a part of the engine hood allows the first duct section to have a large capacity, with a simple structure.

This case also permits the duct bottom wall to include the engine concealment section.

The second duct section preferably includes a duct sidewall that defines the side end of a passage formed in the second duct section, the duct sidewall configuring a guard that covers at least a part of the projection element. Thus forming the guard that covers the projection element by utilization of the duct sidewall configuring the second duct section makes it possible to further simplify the structure and to locate the second duct section closer to the projection element to thereby allow the first duct to have an increased duct length.

Preferably, the construction machine further includes a sound absorption member provided on the inner side surface of the exhaust dust to absorb sound propagated in the exhaust duct. The sound absorption member, provided on the inner side surface of the exhaust dust configuring an exhaust passage of the air in the engine room, can effectively reduce a leak of noise to the outside of the engine room.

This application is based on Japanese Patent application No. 2015-115483 filed in Japan Patent Office on Jun. 8, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:
an engine;
an engine guard defining an engine room which is a space where the engine is housed;
a heat exchanger disposed in the engine room;
a cooling fan disposed in the engine room so as to suck air for cooling from outside of the engine room and to make the air pass through the heat exchanger;
a projection element that projects upward beyond the engine guard; and
an exhaust duct forming a passage for leading the air, which has passed through the heat exchanger, to outside of the engine room, the exhaust duct having a bent shape including a first duct section that includes an upstream end portion surrounding a duct inlet opened in the engine room and a connection portion closer to the projection element than the upstream end portion, the first duct section extending along an axial flow direction of the cooling fan from the upstream end portion to the connection portion, and a second duct section extending upward from the connection portion of the first duct section, the second duct section extending substantially orthogonal to the first duct section and surrounding a duct outlet opened upward outside the engine room, the exhaust duct thereby including an engine concealment section that obstructs a direct view to the engine through the duct outlet from outside the engine room,
wherein the duct inlet is located downstream of the cooling fan with respect to the axial flow direction and radially outward of the cooling fan, and an entirety of the duct outlet is located upward of an entirety of the first duct section.

2. The construction machine according to claim 1, wherein the engine guard includes an engine hood located on an upper side of the engine room to cover the engine room, and the first duct section includes:
   a duct top wall configured by a part of the engine hood and defining an upper end of a passage formed in the first duct section; and
   a duct bottom wall provided at a position separated downward from the engine hood and defining a lower end of the passage formed in the first duct section.

3. The construction machine according to claim 2, wherein the duct bottom wall includes the engine concealment section.

4. The construction machine according to claim 1, wherein the exhaust duct includes an engine room concealment section that obstructs a direct view to the engine room through the duct outlet from outside the engine room.

5. The construction machine according to claim 1, wherein the first duct section includes a duct bottom wall that defines a lower end of a passage formed in the first duct section, the duct bottom wall including the engine concealment section.

6. The construction machine according to claim 1, wherein the second duct section includes a duct sidewall that defines a side end of a passage formed in the second duct section, the duct sidewall configuring a guard that covers at least a part of the projection element.

7. The construction machine according to claim 1, further comprising a sound absorption member provided on an inner side surface of the exhaust duct to absorb sound propagated in the exhaust duct.

\* \* \* \* \*